United States Patent [19]

Hisgen et al.

[11] Patent Number: 4,816,555

[45] Date of Patent: Mar. 28, 1989

[54] WHOLLY AROMATIC MESOMORPHIC POLYESTER AMIDES AND PREPARATION THEREOF

[75] Inventors: Bernd Hisgen, Limburgerhof; Hans-Jakob Kock, Ludwigshafen, both of Fed. Rep. of Germany

[73] Assignee: BASF Aktiengesellschaft, Ludwigshafen, Fed. Rep. of Germany

[21] Appl. No.: 937,874

[22] Filed: Dec. 4, 1986

[30] Foreign Application Priority Data

Dec. 4, 1985 [DE] Fed. Rep. of Germany ....... 3542855

[51] Int. Cl.⁴ .............................................. C08G 63/02
[52] U.S. Cl. .................... 528/176; 528/173; 528/190; 528/193; 252/299.01; 252/299.63
[58] Field of Search ............... 528/176, 173, 190, 193; 252/299.01, 299.63

[56] References Cited

U.S. PATENT DOCUMENTS

| | | | |
|---|---|---|---|
| 4,118,372 | 10/1978 | Schaefgen | 528/190 |
| 4,330,457 | 5/1982 | East et al. | 524/602 |
| 4,351,917 | 9/1982 | Calundann et al. | 524/602 |
| 4,375,530 | 3/1983 | Hay et al. | 524/605 |
| 4,436,894 | 3/1984 | Urasaki et al. | 528/176 |
| 4,536,561 | 8/1985 | Schmidt et al. | 528/176 |
| 4,562,244 | 12/1985 | Yoon | 528/193 |
| 4,564,669 | 1/1986 | Dicke et al. | 528/173 |
| 4,600,764 | 7/1986 | Dicke et al. | 528/193 |

FOREIGN PATENT DOCUMENTS

| | | |
|---|---|---|
| 0081900 | 6/1983 | European Pat. Off. . |
| 0007715 | 2/1984 | European Pat. Off. . |
| 0131846 | 7/1984 | European Pat. Off. . |

OTHER PUBLICATIONS

K. H. Illers–Makromol. Chem. 127 (1969) s. 1 ff.

*Primary Examiner*—Maurice J. Welsh
*Assistant Examiner*—M. L. Moore
*Attorney, Agent, or Firm*—Keil & Weinkauf

[57] ABSTRACT

Wholly aromatic mesomorphic polyester amides which form a liquid-crystalline fiber-forming melt below 320° C., composed of (a) from 3 to 30 mol % of repeat units of the formula I

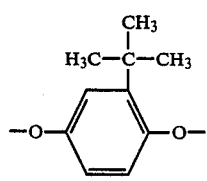

(b) from 3 to 30 mol % of repeat units of the formula II and/or III

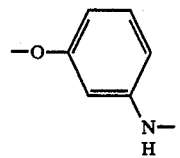

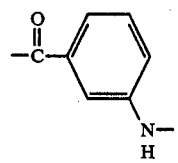

(c) from 2 to 25 mol % of one or more of the repeat units of the formula IV, V or VI,

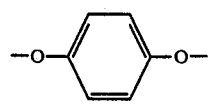

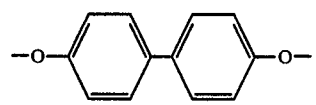

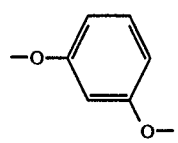

(d) a molar amount corresponding to the total amount of components (a), (b) and (c) excluding the repeat unit of the formula III, of the repeat units of the formula VII

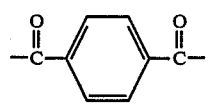

which, if desired, can in part be replaced by repeat units of the formula VIII

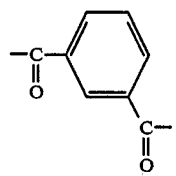

(e) if desired from 5 to 25 mol % of repeat units of the formula IX (Abstract continued on next page.)

(f) repeat units of the formula X 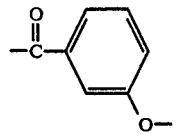
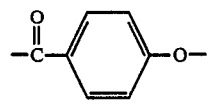
the molar proportions of components (a), (b), (c), (d), (e) and (f) in each case adding up to 100 mol %, and preparation thereof.
9 Claims, No Drawings

WHOLLY AROMATIC MESOMORPHIC POLYESTER AMIDES AND PREPARATION THEREOF

The present invention relates to wholly aromatic mesomorphic polyester amides which form a liquid-crystalline fiber-forming melt below 320° C.

Liquid-crystalline polyester amides are known. However, polymers of this type are in need of improvement with regard to heat distortion resistance, processability and, in particular, abrasion resistance. U.S. Pat. No. 4,330,457 describes polyester amides based on hydroxynaphthalenecarboxylic acid, terephthalic acid, hydroquinone and p-aminophenol. However, these polyester amides have a glass transition temperature of about 105° C. and thus do not have adequate heat distortion resistance. This is also true of the polyester amides disclosed in U.S. Pat. No. 4,351,917 which are based on p-aminophenol, p-hydroxybenzoic acid and hydroxynaphthalenecarboxylic acid. European Pat. No. 7,715 describes polyester amides based on not less than 50% of radicals of p-aminophenol and also alkoxyterephthalic acid. Finally, EP application No. 81,900 discloses polyester amides which are not less than 40% coaxial units such as aromatic dicarboxylic acids, hydroxyaromatic carboxylic acids, bisphenols and aminophenols and contain a sufficient amount of nonlinear radicals which are derived from aromatic m-amino compounds or binuclear aromatic sulfones. However, no indication is provided as to the composition required for obtaining the desired combination of properties.

It is an object of the present invention to provide wholly aromatic mesomorphic polyester amides which form a liquid-crystalline fiber-forming melt below 320° C. and thus are easily processable and, moreover, have a high heat distortion resistance, a high abrasion resistance and also high resilience.

We have found that this object is achieved by wholly aromatic mesomorphic polyester amides which form a liquid-crystalline fiber-forming melt below 320° C. and are composed of (a) from 3 to 30 mol % of repeat units of the formula

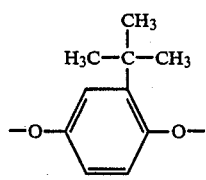

I (b) from 3 to 30 mol % of repeat units of the formula II and/or III

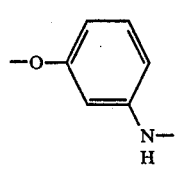

II

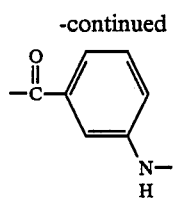

III (c) from 2 to 25 mol % of one or more of the repeat units of the formula IV, V or VI,

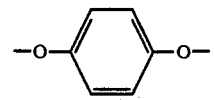

IV

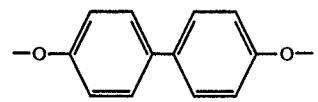

V

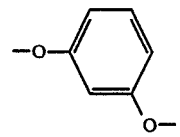

VI (d) molar amounts corresponding to the total amount of components a, b and c except the repeat units of the formula III, of the repeat units of the formula VII

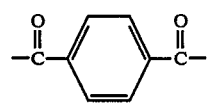

VII which, if desired, can in part be replaced by repeat units of the formula VIII

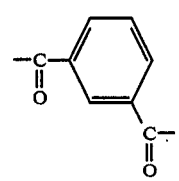

VIII (e) if desired from 5 to 25 mol % of repeat units of the formula IX

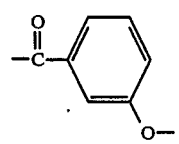

IX (f) repeat units of the formula X

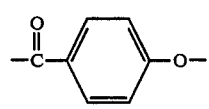

X the molar proportions of components (a) to (f) in each case adding up to 100 mol %.

The novel wholly aromatic polyester amides have the advantage of combining a high heat distortion resistance with a smooth abrasion-resistant surface. The novel polyester amides further have a high stiffness, strength and resilience. Moreover, the novel polyester amides are substantially resistant to chemicals and of low flammability. Furthermore, the novel polyester amides are processable out of the melt at below 320° C.

The liquid-crystalline state of the polyester amides can be detected with a polarization microscope by a method described in German published application DAS No. 2,520,819. Applied in a thickness of 10 μm between glass plates and viewed between crossed polarizers, the polymer melts have textures which can be ascribed to a mesomorphic phase.

The polyester amides according to the invention are composed of
(a) from 3 to 30 mol %, in particular from 5 to 25 mol %, of repeat units of the formula I

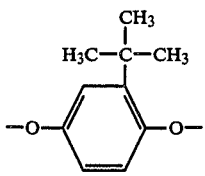

(b) from 3 to 30 mol %, preferably from 5 to 25 mol %, of repeat units of the formula II and/or III

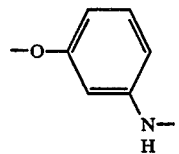

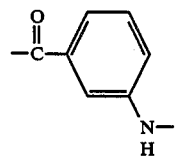

(c) from 2 to 25 mol %, preferably from 5 to 20 mol %, of one or more of the repeat units of the formula IV, V or VI

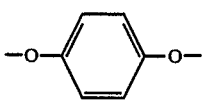

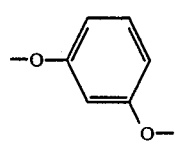

(d) a molar amount corresponding to the total amount of components (a), (b) and (c), except the unit of formula III, of repeat units of the formula VII

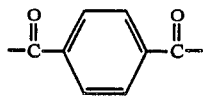

which, if desired, can in part be replaced by repeat units of the formula VIII

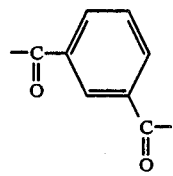

repeat units of the formula VII being preferred,
(e) if desired from 5 to 25 mol % of repeat units of the formula IX

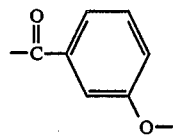

(f) repeat units of the formula X, advantageously in an amount of not less than 10 mol %

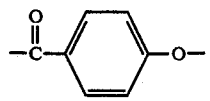

the molar proportions of components (a) to (f) in each case adding up to 100 mol %.

Preferred starting materials are:
for units of the formula I t-butylhydroquinone,
for units of the formula II m-aminophenol,
for units of the formula III m-aminobenzoic acid,
for units of the formula IV hydroquinone,
for units of the formula V 4,4'-dihydroxybiphenyl,
for units of the formula VI resorcinol,
for units of the formula VII terephthalic acid,
for units of the formula VIII isophthalic acid,
for units of the formula IX m-hydroxybenzoic acid and
for units of the formula X p-hydroxybenzoic acid.

Preferred polyester amides contain from 5 to 20 mol % of repeat units of the formula I, from 5 to 20 mol % of repeat units of the formula II and from 5 to 20 mol % of the formula IV.

Other preferred polyester amides contain from 5 to 20 mol % of units of the formula I, from 5 to 20 mol % of units of the formula III and from 5 to 20 mol % of repeat units of the formulae IV and V.

Further preferred polyester amides contain from 5 to 20 mol % of units of the formula I, from 5 to 20 mol % of units of the formula III and from 5 to 20 mol % of units of the formula IV.

Preferred wholly aromatic polyester amides according to the invention have a glass transition temperature Tg of ≧140° C., in particular ≧150° C. The glass transition temperature is measured by the DSC method as described in Makromol. Chem., 127 (1969), 1 et seq. The wholly aromatic liquid-crystalline polyester amides according to the invention form a liquid crystalline fiber-forming melt at a temperature <320° C. Preference is also given to liquid-crystalline aromatic polyester amides which are partially crystalline at ≧200° C. and ≦300° C.

The liquid-crystalline polyester amides according to the invention can be obtained in a manner similar to techniques as described for example in U.S. Pat. Nos. 4,375,530 and 4,118,372.

In an advantageous embodiment, the polyester amides according to the invention are obtained in a single-stage process by converting the underivatized starting compounds using anhydrides of lower fatty acids, for example fatty acids of 2 to 4 carbon atoms, in particular acetic anhydride. This reaction may be catalyzed with customary amounts of catalysts of the type described in EP applicaton No. 131,846. In the reaction, the underivatized hydroxyamino and carboxy compounds are heated together with a fatty acid anhydride, advantageously in a molar excess of not less than 5%, based on the hydroxyl and amino groups present, in an inert gas atmosphere and with stirring to a temperature at which reflux occurs. Advantageously the temperature is raised in stages, for example not more than 5 hours, preferably up to 2 hours, at 130° to 200° C. The temperature is then raised to 250° to 350° C., for example in the course of 2 to 2½ hours, while excess fatty acid anhydrides and fatty acids are distilled off. To complete the reaction, it has been found to be advantageous to employ reduced pressure, for example of from 200 to 0.1 mbar, toward the end of the reaction.

It is a remarkable and unforeseeable feature of this single-stage process that the desired polymers are obtained in a relatively short time in a troublefree and complete reaction without catalysts. This is all the more remarkable because the large number of chemically different hydroxyl and amino groups would be expected to lead to differences in reactivity and hence to inadequate polymer construction.

The wholly aromatic liquid-crystalline polyester amides thus obtained are advantageously condensed further in the solid state, for example at 150°-250° C., until the desired viscosity is obtained. This postcondensation in the solid phase can take place not only before but also after thermoplastic processing. The solid phase condensation is advantageously carried out in an inert gas atmosphere, for example under nitrogen.

The polyester amides can be admixed with conventional additives and assistants in active amounts. Conventional additives and assistants are stabilizers, oxidation inhibitors, agents against thermal decomposition and decomposition by ultraviolet light, lubricants, mold release agents, colorants, such as dyes or pigments, fibrous or pulverulent fillers and reinforcing agents, nucleating agents or plasticizers.

Stabilizers can be added to the polymers at any stage of processing or when completed. Preferably the stabilizers are added early on to prevent the onset of decomposition before the polymers are protected.

Suitable oxidation inhibitors and heat stabilizers are for example halides of metals of group I of the periodic table, for example of sodium, potassium or lithium with copper(I) halides, such as chlorides, bromides, or iodides, sterically hindered phenols, hydroquinones, various substituted representatives of these groups and combinations thereof in concentrations of up to 1% by weight, based on the polymer.

Suitable UV stabilizers are, for example, substituted resorcinols, salicylates, benzotriazoles, benzophenones and the like and mixtures thereof. These UV stabilizers are generally employed in amounts of up to 2% by weight on the polymer.

Suitable assistants also include dyes, which are generally employed in amounts of up to 5% by weight, such as nigrosine, pigments, such as titanium dioxide, cadmium sulfide, cadmium sulfide selenide, phthalocyanines, ultramarine blue or carbon black.

Suitable fibrous or pulverulent fillers and reinforcing agents which are employed in amounts of, for example, up to 70% by weight on the polymer are for example carbon fibers, glass fibers, amorphous silica, asbestos, calcium silicate, aluminum silicate, magnesium carbonate, kaolin, chalk, quartz powder, mica or feldspar.

Suitable nucleating agents are for example talcum, calcium fluoride, sodium phenylphosphinate, aluminum oxide or finely divided polytetrafluoroethylene.

Suitable additives finally also include plasticizers, in amounts of, for example up to 20% by weight, such as dioctyl phthalate, dibenzyl phthalate, butyl benzyl phthalate, hydrocarbon oils, N,N-butylbenzenesulfonamide, and o- and p-tolueneethylsulfonamide.

The wholly aromatic liquid-crystalline polyester amides according to the invention are suitable for preparing filaments, fibers, films, foams and industrial moldings by injection molding, pressing or extruding. The moldings prepared from the polyester amides according to the invention have excellent mechanical properties, such as stiffness, strength and resilience. They are remarkably resistant to chemicals and flame-retardant. In addition they have a high heat distortion resistance and a smooth, abrasion-resistant surface. The polyester amides according to the invention are therefore highly suitable for preparing moldings for electrical engineering, data processing, automotive construction and other industrial sectors. But they can also be used as surface coating materials, in pulverulent dispersion or in the form of film.

The invention is illustrated by the following examples.

EXAMPLE 1

0.24 mol of terephthalic acid, 0.312 mol of 4-hydroxybenzoic acid, 0.12 mol of t-butylhydroquinone, 0.12 mol of m-aminophenol and 101 ml of acetic anhydride are heated with stirring under nitrogen from 150° C. to 300° C. in the course of 2 h 50 min, while excess acetic anhydride and acetic acid are distilled off. The pressure is then reduced to 30 mbar in the course of 1 h 20 min to give a viscous fiber-forming melt. The polymer melt and the cold polymer have a pearlescent luster. The polymer has a smooth, hard and abrasion-resistant surface. DSC measurements indicate a glass transition temperature of 165° C. and a melting point of 300° C. The intrinsic viscosity is 0.78 dl/g, measured at 60° C. in 0.1% strength (wt./vol.) solution in pentafluorophenol.

EXAMPLE 2

0.22 mol of terephthalic acid, 0.143 mol of 4-hydroxybenzoic acid, 0.077 mol of hydroquinone, 0.099 mol of t-butylhydroquinone, 0.044 mol of 4,4'-dihydroxybiphenyl, 0.143 mol of 3-aminobenzoic acid and 93 ml of acetic anhydride are heated with stirring under nitrogen from 150° C. to 300° C. in the course of 2 h 50 min, while excess acetic anhydride and acetic acid are distilled off. The pressure is then reduced to 65 bar in the course of 50 min to give a viscous fiber-forming melt. The polymer melt and the cold polymer have a pearlescent luster. The polymer has a smooth, hard and abrasion-resistant surface. DSC measurements indicate a glass transition temperature of 172° C.

The intrinsic viscosity is 0.58 dl/g, measured at 60° C. in 0.5% strength (wt./vol.) solution in 4-chlorophenol.

We claim:

1. A wholly aromatic mesomorphic polyester amide which forms a liquid-crystalline fiber-forming melt below 320° C., composed of (a) from 3 to 30 mol % of repeat units of the formula I

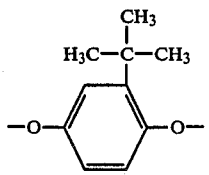

(b) from 3 to 30 mol % of repeat units of the formula II and/or III

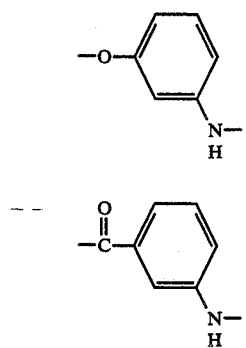

(c) from 2 to 25 mol % of one or more of the repeat units of the formula IV, V or VI,

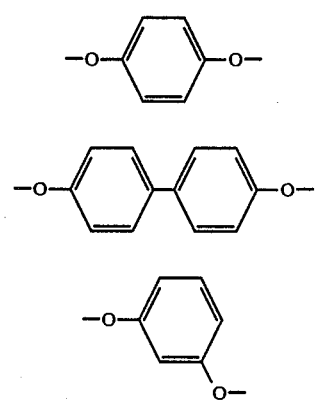

(d) a molar amount corresponding to the total amount of components a, b and c except the repeat unit of the formula III, of the repeat units of the formula VII

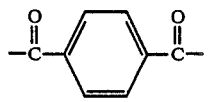

which, if desired, can in part be replaced by repeat units of the formula VIII

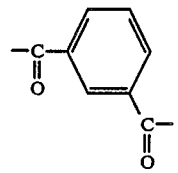

(e) if desired from 5 to 25 mol % of repeat units of the formula IX

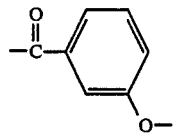

(f) repeat units of the formula X

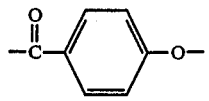

the molar proportions of components (a), (b), (c), (d), (e) and (f) in each case adding up to 100 mol %.

2. A wholly aromatic mesomorphic polyester amide as claimed in claim 1, composed of (a) from 5 to 25 mol % of repeat units of the formula I (b) from 5 to 25 mol % of repeat units of the formula II and/or III (c) from 5 to 20 mol % of one or more repeat units of the formulae IV, V and VI (d) a molar amount corresponding to the total amount of components (a), (b) and (c) excluding the repeat unit of the formula III, of repeat units of the formula VII and (f) repeat units of the formula X, the molar proportions of components (a), (b), (c), (d) and (f) in each case adding up to 100 mol %.

3. A wholly aromatic mesomorphic polyester amide as claimed in claim 1, which contains as component (a) from 5 to 20 mol % of repeat units of the formula I, as component (b) from 5 to 20 mol % of repeat units of the formula II and as component (c) from 5 to 20 mol % of repeat units of the formula IV.

4. A wholly aromatic mesomorphic polyester amide as claimed in claim 1, which contains as component (a) from 5 to 20 mol % of repeat units of the formula I, as component (b) from 5 to 20 mol % of repeat units of the formula III and as component (c) from 5 to 20 mol % of a mixture of repeat units of the formulae IV and V.

5. A wholly aromatic mesomorphic polyester amide as claimed in claim 1, which contains as component (a) from 5 to 20 mol % of repeat units of the formula I, as component (b) from 5 to 20 mol % of repeat units of the formula III and as component (c) from 5 to 20 mol % of repeat units of the formula IV.

6. A wholly aromatic mesomorphic polyester amide as claimed in claim 1, which has a glass transition temperature Tg 140° C.

7. A fiber from a polyester amide as claimed in claim 1.

8. A film from a polyester amide as claimed in claim 1.

9. A molding from a polyester amide as claimed in claim 1.

* * * * *